Oct. 21, 1952          G. BURROWS          2,614,973

SHORT PATH FRACTIONATING STILLS

Filed Dec. 10, 1948

INVENTOR

Godfrey Burrows

ATTORNEYS

Patented Oct. 21, 1952

2,614,973

UNITED STATES PATENT OFFICE 2,614,973

SHORT PATH FRACTIONATING STILLS

Godfrey Burrows, Sale, England, assignor to Metropolitan-Vickers Electrical Company Limited, London, England, a company of Great Britain Application December 10, 1948, Serial No. 64,575
In Great Britain December 19, 1947

4 Claims. (Cl. 202—205)

This invention relates to short path fractionating stills of the kind which operate with counter current reflux. In such arrangements the distilland flows downwards through a series of cells arranged in step like formation while the distillate from a condensing surface associated with one cell flows into the next higher cell, so that in the course of time the lighter fractions are concentrated in the highest cell and the heavier fractions are concentrated in the lowest cell.

The present invention has for an object the provision of improved stills of this general nature which enable continuous operation to be effected.

A further object of this invention is to provide a still in which means is provided for obtaining any desired degree of reflux.

Another object of the invention is to provide a still in which the distilland flows continuously in the form of a thin sheet.

Another object of this invention is to provide stills of such shape that they may be enclosed economically in a vacuum vessel.

Other objects and advantages of the present invention will become apparent in the description of the various short path fractionating stills illustrated in the accompanying drawings, in which—

Figure 1:
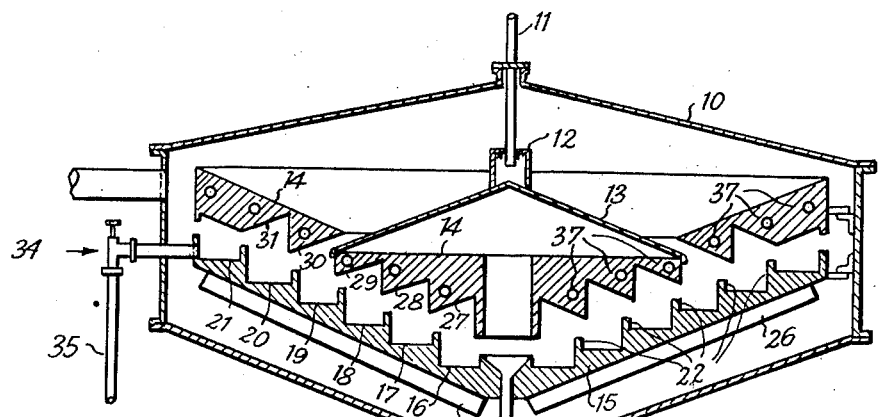
Figure 2:
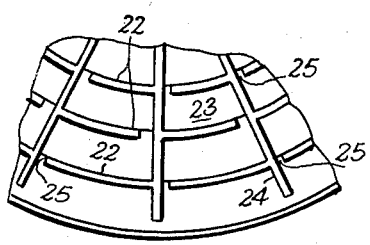
Figure 3:
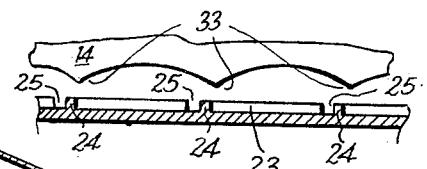
Figure 4:
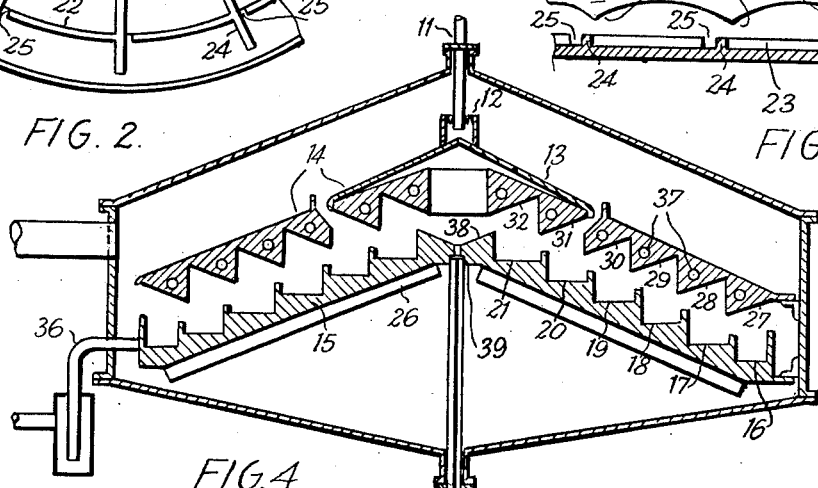
Figure 5:
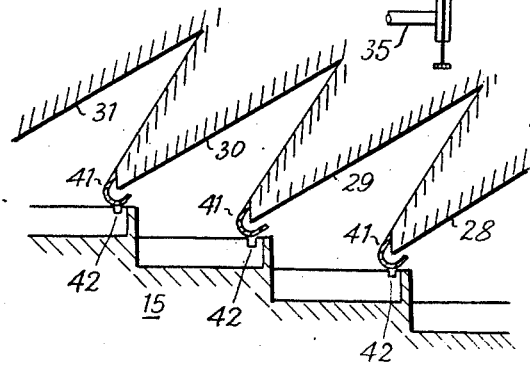

Fig. 1 is a diagrammatic sectional elevation of a vacuum still suitable for treating a liquid having a higher percentage of volatile fractions, Fig. 2 is a fragmentary plan view, and Fig. 3 is a fragmentary side view of parts of the vacuum still shown in Fig. 1, Fig. 4 is a diagrammatic sectional elevation of a vacuum still suitable for treating a liquid having a higher percentage of less volatile fractions, and Fig. 5 is a fragmentary cross section of a modification suitable for use in the vacuum still shown in Fig. 1 and Fig. 4.

The vacuum stills of the present invention comprise an evaporating pan which is provided with a series of cells arranged in step like formation and a condenser having a plurality of surfaces, one for each cell, which are inclined to the level of the liquid in the respective cells and arranged so that the condensate drips into the next higher cell. In addition each cell is provided with an aperture or slot in its wall so that liquid accumulating in the cell may flow downwards into the next lower cell or directly into the lowest cell. The arrangements thus operate with the lighter fractions passing continuously upwards towards the highest cell and with the heavier fractions flowing in the counter current towards the lowest cell.

An important feature of the stills of this invention consists in causing the condensate from one cell to drip into the next higher cell at a point remote from the aperture or slot in this higher cell so that a long path flow is provided for the condensate during re-evaporation.

Referring now to Figs. 1, 2 and 3 of the drawings, the vacuum still there shown comprises a vacuum tight housing 10 generally of cylindrical form. The liquid to be treated is introduced into the housing through the pipe 11. The liquid flows over the serrated edge of distributor 12 and spreads over the conical surface 13 from which it drips through a gap in the condenser 14 into a channel 19 formed in the evaporator 15. This evaporator 15 comprises a body, generally of inverted conical shape in cross-section, which is formed by casting or machining and which is provided with a series of concentric channels 16—21 arranged in step like formation and rising towards the outermost channel 21. The channels are separated from one another by the partition walls 22 and are subdivided into cells 23 by radially arranged barriers 24 (see Fig. 2) so that the liquid in the channels may be evenly distributed even though the still is not arranged to be perfectly level. As shown in Figs. 2 and 3 each cell 23 is provided with a slot 25 in its partition wall 22 adjacent one corner so that liquid accumulating in the cell may overflow into the next lower cell. These slots 25 are also arranged alternately at opposite ends of the partition wall 22 so that liquid flowing downwards through the cells follows as long a path as possible. Means such as electric heaters 26 are provided for heating the evaporating pan 15 and they may be graded in manner known in the art so that the outer part of the evaporator is cooler or hotter than the inner part.

The condenser 14 which may also be formed by casting or machining and is provided with concentric condensing surfaces 27—31 which are inclined to the surface of the liquid in the channels 16—21 and which may be treated by plating, polishing or otherwise to facilitate wetting of the surface by the distillate. The condensing surfaces are arranged in relation to the channels such that liquid evaporated from one channel and condensing on the surface arranged immediately above this channel runs down the surface to its lower edge and drips therefrom into the next higher channel. Thus in the arrangement of Fig. 1 liquid evaporated from the channel 16 condenses on the surface 27 and drips therefrom into channel 17, similarly liquid evaporated from channel 17 drips from surface 28 into channel 18 and so on until the last stage in which the condensate on surface 31 drips into the last and highest channel 21. So as to secure a long path for the condensate in the channel into which it drips, the lower edges of the condensing surfaces 27—31 are shaped with an undulating contour as shown in Fig. 3 to provide a plurality of points 33 which are positioned one for each cell 23 over that corner of the cell adjacent the partition 22 between this cell and the next lower cell and remote from the slot 25 in this partition.

In the operation of the still it will be appreciated that there will be a continuous flow of the lighter fraction towards the uppermost channel 21, and via the condensing surfaces 27 to 31, and of the heavier fractions towards the lowermost channel 16 via the slots 25 in the partition walls of the various cells. By causing liquid to enter continuously through the pipe 11 distillate may be drawn off from the uppermost channel 21 through the valve 34 and pipe 35, while the residue of heavier fractions may be withdrawn through the pipe 36. By control of the valve 34 so that condensate accumulates in the channel 21 faster than it is withdrawn through the pipe 35, and so overflows through the slots into the lower channel 20 and so on, any desired degree of reflux may be obtained. It will be appreciated moreover that according to the nature of the liquid to be treated, the kind and degree of fractionation desired and the amount of reflux, the channel into which the liquid is introduced may be varied as required. In addition means may be provided for the controlled withdrawal of intermediate fractions from a channel intermediate the channels 16 and 21 if such intermediate fractions are required.

Since the area of the channels 16—21 increases progressively towards the highest channel 21, the still shown in Fig. 1 is particularly adapted for treating a liquid that has a greater proportion of lighter fractions.

In Fig. 4 there is shown a still which is adapted for treating liquid which has a greater proportion of heavier fractions since in this form the highest channel of the evaporator has the smallest area. The evaporator 15 is here formed generally of conical shape in cross-section with the flow of distillate upwards towards its apex. In other respects the still of Fig. 4 is essentially the same as that of Fig. 1 and the same reference numerals are applied to indicate corresponding parts. It will be observed however that the condenser 14 in this case has one additional condensing surface 32 which is directed to cause the condensate to drip into a central depression 38 at the apex of the evaporator 15 and which is higher than the last channel 21, distillate being withdrawn from the depression under the control of valve 39 through the pipe 35. If desired means may be provided for the controlled withdrawal of intermediate fractions from any of the channels 17 to 21.

In Fig. 5 there is shown as a fragmentary sectional elevation a modified form of the condenser used in the stills of Figs. 1 and 4. In this arrangement it will be observed that the condensing surfaces 28—31 are increased in length, each extending upwards above the lower edge of the next lower surface so as to provide a greater area of condensing surface over each channel. In addition this figure shows an alternative arrangement for directing the condensate from each surface into the desired part of the adjacent higher channel. Instead of forming the lower edge of each of the surfaces with an undulating contour as shown in Fig. 3, this edge is provided with a small trough 41 which collects the condensate and which is formed with outlets 42 from which the condensate may drip into the desired part of the higher channel.

In all forms of still described herein the evaporator will be heated, for example by means of electric heaters 26, and the condenser will be cooled, for example by circulating liquid through the pipes 37, to the extent required by the nature of the liquid being distilled and in some cases it may be desirable to make the several channels or cells and the several condensing surfaces separate so that the temperatures of the various parts of the evaporator and condenser may be controlled individually.

The stills may also be used for the fractionation of condensable (for example hydrocarbon) gas mixtures by operating at low temperatures and low pressures. For this purpose the condenser would be cooled by means of a suitable refrigerant and the evaporator would be cooled also but with controllable heating units for the several channels which provide just sufficient heat to effect evaporation, the temperature of the channels being graded so as to assist separation of the individual components of the distilland.

It will be appreciated that the short path fractionating stills of the present invention are particularly suitable for operation under so called "molecular distillation" conditions, that is under vacuum conditions such that the mean free path of the distilling molecules in their passage from the evaporator to the condenser is of the same order of magnitude or greater than the distance between the evaporator and the condenser, so that the average distilling molecule travels from the evaporator to the condenser substantially without collision with residual gas molecules. The operation of the stills is however not necessarily confined to this type of distillation.

What I claim as new and desire to secure by Letters Patent of the United States is:

1. A short path fractionating still, comprising an evaporating pan having a series of concentric channels arranged in step-like formation, a plurality of radial barriers dividing each of said channels into a plurality of arcuate-shaped cells the cells in adjacent channels being provided with overflow outlets which are relatively staggered circumferentially of the channels, and a condenser having a series of inclined concentric condensing surfaces positioned one over each channel of the evaporating pan and each having discharge means so constructed as to deliver condensate from the cells of one channel to respective individual cells of the next higher channel only at points remote from the outlets of said cells.

2. A short path fractionating still as defined in claim 1, in which said discharge means of each of said inclined condensing surfaces is formed by an undulating contour of its lower edge which provides a plurality of points extending below the general level of said edge each of said points being positioned over a cell of the next higher channel in such a position as to deliver condensate into said cell at a point remote from the outlet of said cell.

3. A short path fractionating still as defined in claim 1, in which said discharge means comprises a trough for collecting condensate, said troughs being provided with outlets positioned to direct condensate into the respective cells of the next higher channel at points remote form the outlets of said cells.

4. A short path fractionating still, comprising an evaporating pan having a series of concentric channels divided by annular walls and arranged in step-like formation, a plurality of radially extending barriers dividing the channels into a plurality of sector-shaped groups of stepped cells, and an overflow outlet from each cell leading to the next lower cell of a group, said outlets being positioned alternately at opposite ends of the annular wall dividing said cells, and a condenser comprising a series of inclined concentric condensing surfaces which are positioned one over each channel of the evaporating pan and shaped each to deliver condensate from the cells of one channel to individual cells of the next higher channel only at points, remote from the outlets of said cells.

GODFREY BURROWS.

REFERENCES CITED

The following references are of record in the file of this patent:

UNITED STATES PATENTS

| Number | Name | Date |
| --- | --- | --- |
| 2,234,166 | Hickman | Mar. 11, 1941 |
| 2,298,377 | Hickman | Oct. 13, 1942 |
| 2,406,421 | Wollner et al. | Aug. 27, 1946 |
| 2,446,997 | Brewer et al. | Aug. 17, 1948 |

OTHER REFERENCES

Brewer et al.: "Concentration of the Isotopes of Mercury by Free Evaporation," Journal of Research of Nat. Bur. of Standards, Jan. 1947, pp. 129–135.

Wollner et al.; "A Fractionating Molecular Still," Ind. and Eng. Chem. Anal. Ed., vol. 16, No. 8 (1944), pp. 529–531.